United States Patent [19]

Kubo et al.

[11] 4,056,988
[45] Nov. 8, 1977

[54] DRIVING SYSTEM FOR USE IN MOTOR VEHICLE

[75] Inventors: Seitoku Kubo; Kojiro Kuramochi; Kunio Morisawa; Kiyoshi Ohnuma, all of Toyota, Japan

[73] Assignee: Toyota Jidosha Kogyo Kabushiki Kaisha, Toyota, Japan

[21] Appl. No.: 712,167

[22] Filed: Aug. 6, 1976

Related U.S. Application Data

[63] Continuation-in-part of Ser. No. 673,543, April 5, 1976.

[30] Foreign Application Priority Data

Aug. 8, 1975 Japan .................................. 50-95888
Aug. 8, 1975 Japan .................................. 50-95889

[51] Int. Cl.² ...................... F16H 37/08; F16H 57/10
[52] U.S. Cl. .................................. 74/695; 74/740; 74/781 R
[58] Field of Search ................ 74/694, 695, 700, 701, 74/740, 730, 781 R; 180/70 R

[56] References Cited

U.S. PATENT DOCUMENTS

| | | | |
|---|---|---|---|
| 2,800,037 | 7/1957 | Czuba et al. ................ | 180/70 R X |
| 3,401,763 | 9/1968 | Rolt ............................. | 180/70 R X |
| 3,444,761 | 5/1969 | Wickman ..................... | 74/740 |
| 3,614,902 | 10/1971 | Candellero ................... | 74/695 |
| 3,614,989 | 10/1971 | Bott et al. .................... | 180/70 R X |
| 3,703,107 | 11/1972 | Piret ............................. | 74/695 |
| 3,799,000 | 3/1974 | Piret ............................. | 74/694 |

FOREIGN PATENT DOCUMENTS 814,210  6/1959  United Kingdom ................ 74/700

*Primary Examiner*—Samuel Scott
*Assistant Examiner*—Lance W. Chandler
*Attorney, Agent, or Firm*—Finnegan, Henderson, Farabow & Garrett

[57] ABSTRACT

A driving system acting in conjunction with a motor vehicle having a torque convertor coaxially coupled to the output shaft of the engine, and transfer means having a driving gear coaxially coupled to the output shaft of the overdrive means and a driven gear coupled to its driving gear. Overdrive means having a planetary gear mechanism are coaxially coupled to the output shaft of the torque convertor, and include an output shaft coupled to the driving gear of the transfer means. An automatic transmission is coaxially coupled to the driven gear of the transfer means and includes a planetary mechanism and friction engaging means to provide the desired mode of operation. A differential gear having a driving gear coupled to the output shaft of the automatic transmission drives the motor vehicle. The automatic transmission is positioned below the overdrive means. The torque convertor is positioned in side-by-side relation with the overdrive means, and the differential gear is positioned in side-by-side relation with the automatic transmission an below the torque convertor and the overdrive means. This overdrive means is removably coaxially coupled to the output shaft of the torque convertor, allowing an optional installation thereof.

14 Claims, 5 Drawing Figures

| GEAR | 53 | 54 | 55 | 56 | 57 | 38 | 35 | 36 |
|------|----|----|----|----|----|----|----|----|
| 1st  | O  | X  | X  | O  | O  | O  | O  | X  |
| 2nd  | O  | X  | O  | X  | X  | O  | O  | X  |
| TOP  | O  | O  | X  | X  | X  | O  | O  | X  |
| O/D  | O  | O  | X  | X  | X  | X  | X  | O  |
| REV. | X  | O  | X  | O  | X  | O  | O  | X  |

| GEAR | 53 | 54 | 55 | 56 | 57 |
|------|----|----|----|----|----|
| 1st  | ○  | ×  | ×  | ○  | ○  |
| 2nd  | ○  | ×  | ○  | ×  | ×  |
| 3rd  | ○  | ○  | ×  | ×  | ×  |
| REV  | ×  | ○  | ×  | ○  | ×  |

DRIVING SYSTEM FOR USE IN MOTOR VEHICLE

This application is a continuation-in-part of application Ser. No. 673,543, filed Apr. 5, 1976.

BACKGROUND OF THE INVENTION

1. Field of the Invention

This invention generally relates to a driving system for a motor vehicle, and more particularly to a driving system arranged to provide a low center of gravity and to optimize the use of available design space.

2. Description of the Prior Art

The requirements to meet air pollution standards while increasing the efficiency of motor vehicles because the limited supply of inexpensive fuels, have posed design problems for the motor vehicle industry. Noise abatement requirements have compounded these problems and led to new concepts in vehicular design.

It has been suggested in the prior art to provide an overtop means presenting a reduction gear ratio of less than 1.0 in an automatic transmission system at high speed travel, in order to reduced the RPM of an internal combustion engine for efficiency purposes. The overdrive means for the overtop means is normally positioned either in the front or back of the transmission system, or, alternatively, an overtop means is provided to cause a reduction gear ratio of up to 1.0 at the desired transmission stage.

These prior art solutions do not result in a reduction in weight of the vehicle body because additional spaced is necessitated for the overtop means and the overdrive means is required to be arranged coaxially with the shaft of the transmission system in both front-engine-front-drive systems (F-F system) and front-engine rear drive systems (F-R system). Further, the installation of overtop means is particularly difficult in rear-engine-rear drive system (R-R system).

SUMMARY OF THE INVENTION

Accordingly, it is a primary object of this invention to provide a driving system for use in a motor vehicle, which optimizes the use of available design space in an engine compartment.

It is another object of the invention to provide a driving system having a low center of gravity and an increased minimum height, as measured from the ground to the bottom of a vehicle.

It is a further object of the invention to provide a driving system which may be used with F-F, R-R and F-R systems, and also with four wheel driving systems.

A still further object of this invention is to provide a driving system which is arranged to allow easy removal of the overdrive means.

Yet another object of this invention is to provide a driving system which provides increased torque capacity for the torque converter and which is compact in size and light in weight, compared to prior art driving systems.

Additional objects and advantages of the invention will be set forth in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the driving system of this invention comprises a torque convertor coaxially coupled to the output shaft of the engine and having an output shaft; transfer means having a driving gear coaxially coupled to the output shaft of overdrive means and a driven gear coupled to said driving gear; said overdrive means having a planetary gear mechanism coaxially coupled to the output shaft of said torque convertor and an output shaft coupled to said driving gear of said transfer means; an automatic transmission coaxially coupled to said driven gear of said transfer means, having a planetary mechanism and friction engaging means to provide the desired mode of operation, and an output shaft; and a differential gear having a driving gear coupled to the output shaft of said automatic transmission for driving the motor vehicle.

Preferably the automatic transmission is positioned below said overdrive means and comprises an input shaft with the torque convertor having an output shaft coaxially coupled to an input shaft of said overdrive means.

It is also preferred that the torque convertor be positioned in side-by-side relationship with respect to the overdrive means, and that the differential gear be positioned in side-by-side relationship with the automatic transmission and below the torque convertor and the overdrive means.

The invention consists in the novel parts, constructions, arrangements, combinations and improvements shown and described. The accompanying drawings, which are incorporated in and constitute a part of this specification, illustrate one embodiment of the invention and, together with the description, serve to explain the principles of the invention.

DETAILED DESCRIPTION OF THE PREFERRED EMBODIMENTS

Reference will now be made in detail to the present preferred embodiment of the invention, an example of which is illustrated in the accompanying drawings.

Figures 1, 3:
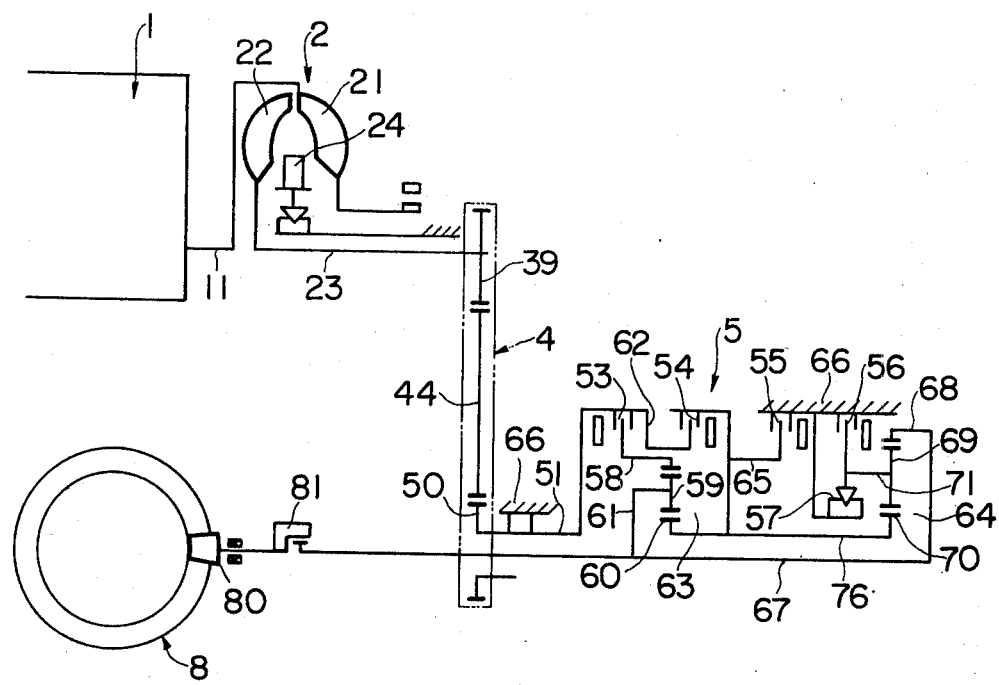
FIG. 1 is a schematic view of one embodiment of the present invention used in the driving system of a motor vehicle.
FIG. 3 is a table showing the operation of the transmission elements of the driving system according to the invention.
Figure 2:
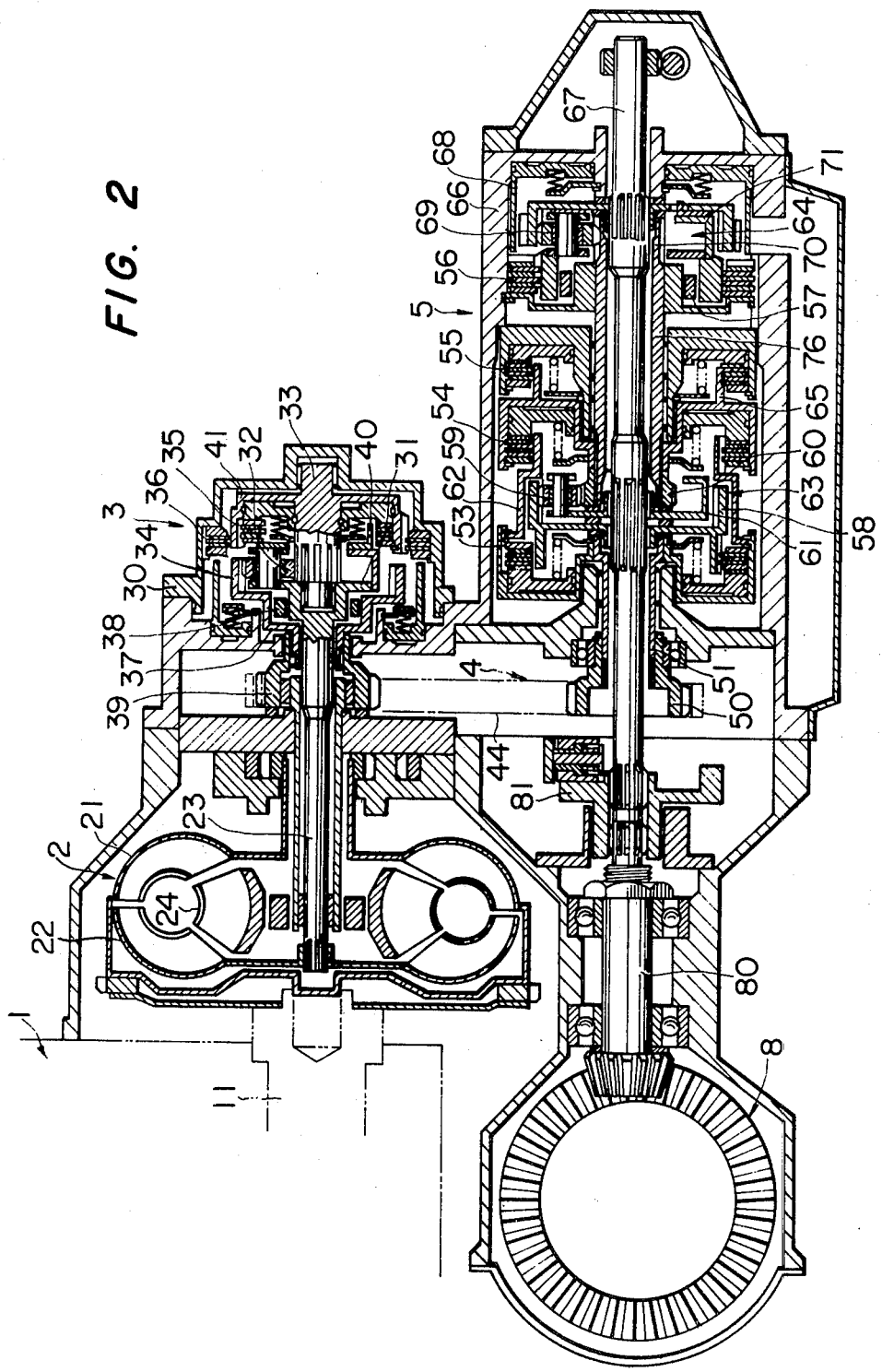
FIG. 2 is a cross-section view showing a detailed arrangement of the driving system of FIG. 1.

Referring now to FIGS. 1 and 2, it may be seen that the driving system comprises torque convertor 2, overdrive means 3, transfer means 4, automatic transmission 5 and differential gear 8. The torque convertor 2 includes pump 21, turbine 22, and stator 24. The output shaft 11 of internal combustion engine 1 is rotatably coupled to a shaft (not shown) of pump 21. The output shaft 23 of torque converter 2 is rotatably coupled to a shaft (not shown) of turbine 22.

In accordance with the invention, the output shaft 23 is integral with an input shaft of overdrive means 3. Thus, as seen in FIG. 2, the overdrive means 3 comprises a set of clutch means 35, a set of a brake means 36, a one-way clutch 38, and a planetary gear mechanism set. The output shaft 23 engages the planetary gear carrier 31 of the planetary gear mechanism. Clutch means 35 is positioned between hub 40, which, in turn, is coupled to the planetary gear carrier 31, and sun gear 33. Brake means 36 is interposed between the clutch means 35 and transmission case 30.

Thus, the sun gear 33 of the planetay gear mechanism is brought into engagement with the transmission case 30 due to actuation of the brake means 36, while the planetary gear 32 rotatably supported by the planetary gear carrier 31 meshes with the sun gear 33 and the internal gear 34. The internal gear 34 is coupled through output shaft 37 to driving gear 39 in the transfer means 4. One-way clutch 38 is interposed between output shafts 23 and 37. Driving gear 39 of transfer means 4 transmits a rotational force through idler gear 44 to driven gear 50, which is coupled to input shaft 51 of automatic transmission 5. The automatic transmission 5 comprises two sets of clutch means 53 and 54, two sets of brake means 55 and 56, two sets of planetary gear mechanism 63 and 64 and a single one-way clutch 57.

As here embodied, a first clutch means 53 (the front clutch) is interposed between an internal gear 58 of a first planetary gear 63 (the front planetary gear) and an input shaft 51 of the automatic transmission 5. A second clutch means 54 (the rear clutch) is interposed between hub 62 coupled to the front clutch 53 and sun gear shaft 76, which interconnects the sun gears 60 and 70 respectively of planetary gear mechanisms 63 and 64 together. First brake means 55 (the front brake) is interposed between hub 65, which is coupled to the rear clutch 54, and transmission case 66. A planetary gear carrier 71 supporting the planetary gear 69 of the second planetary gear mechanism 64 is coupled through one-way clutch 57 to the transmission case 66, and through the second brake means 56 (the rear brake) to the transmission case 66.

The planetary gear carrier 61, which supports the planetary gear 59 in the front planetary gear mechanism 63, and the internal gear 68 in the rear planetary gear mechanism 64 are coupled to an output shaft 67 which is coaxial with input shaft 51. The output shaft 67 is fitted in a driving gear 80 of the differential gear 8 through a governor (not shown) by splines (not shown) defined within shaft 67.

In operation of the driving system according to the preferred embodiment, the speed-change action is accomplished by the overdrive means 3, clutch means 35, 53 and 54, brake means 36, 55 and 56 and one-way clutches 38 and 57. The table of FIG. 3 shows the operation at the respective transmission stages of these friction-engaging means, in which designation "O" represents the engagement of the respective transmission element, and designation "X" represents the release of the respective transmission element. The extreme left column identifies the various gear positions associated with the transmission system, that is, 1st, 2nd, 3rd, overdrive and reverse, and the top column identifies the particular transmission element. It is thus seen, for example, that in first gear, transmission elements 53, 56, 57, 38 and 35 are engaged, and transmission elements 54, 55 and 36 are not engaged (released).

The power of internal combustion engine 1 is transmitted to output pump 21 of torque converter 2. Thus a shaft of pump 21 is rotatably coupled to the output shaft 11 of internal combustion engine 1. The output shaft 23 of torque convertor 2 is rotatably coupled to a shaft of turbine 22. However, when the overdrive means 3 is being released, the power output of internal combustion engine 1 is transmitted through the output shaft 37 to the driving gear 39 of the transfer means 4, because one-way clutch 38 is being engaged. When coasting, the one-way clutch 38 is released, and the RPM is thereby reduced.

When the overdrive means 3 is in operation, brake means 36 is engaged and the sun gear 33 is fixed. The power output of internal combustion engine 1 then presents an increased RPM, which is transmitted through internal gear 34 to driving gear 39. The power is then in turn transmitted from driving gear 39 through idler gear 44 to driven gear 50. In the forward direction mode of operation of transmission 5, the front clutch 53 therein is maintained in engagement.

As here embodied, in the first forward speed mode of operation, the front clutch is engaged with one-way clutch 57. Power is then transmitted at reduced RPM through the planetary gear carrier 61 in the front planetary gear mechanism 63 and sun gears 60 and 70 in the front and rear planetary gear mechanisms 63 and 64, through internal gear 68 in the rear planetary gear mechanism 64, to the output shaft 64. In this case, one-way clutch 57 is released with reduced RPM, because the rear brake 56 is engaged.

In the second forward speed mode of operation, front brake 55 is brought into engagement, and the sun gear shaft 76 is then engaged. Power is then transmitted at reduced RPM from the front clutch 53 through the planetary gear carrier 61 to the output shaft 67.

In the third forward speed mode of operation, the front and rear clutches 53 and 54 are engaged, and the front planetary gear mechanism 63 rotates integrally therewith. Power is then transmitted to the output shaft 67, at the reduced gear ratio of 1.0.

In the reverse mode of operation, rear clutch 54 and rear brake 56 are brought into engagement. Power is then transmitted through the rear planetary gear-mechanism 64 and sun gear 70 to the output shaft 67, with the RPM being reduced by internal gear 68. In this manner, the power transmitted to the output shaft 67 of the automatic transmission 5, is transmitted through governor 81 to the input shaft of differential gear 80.

Figures 4, 5:
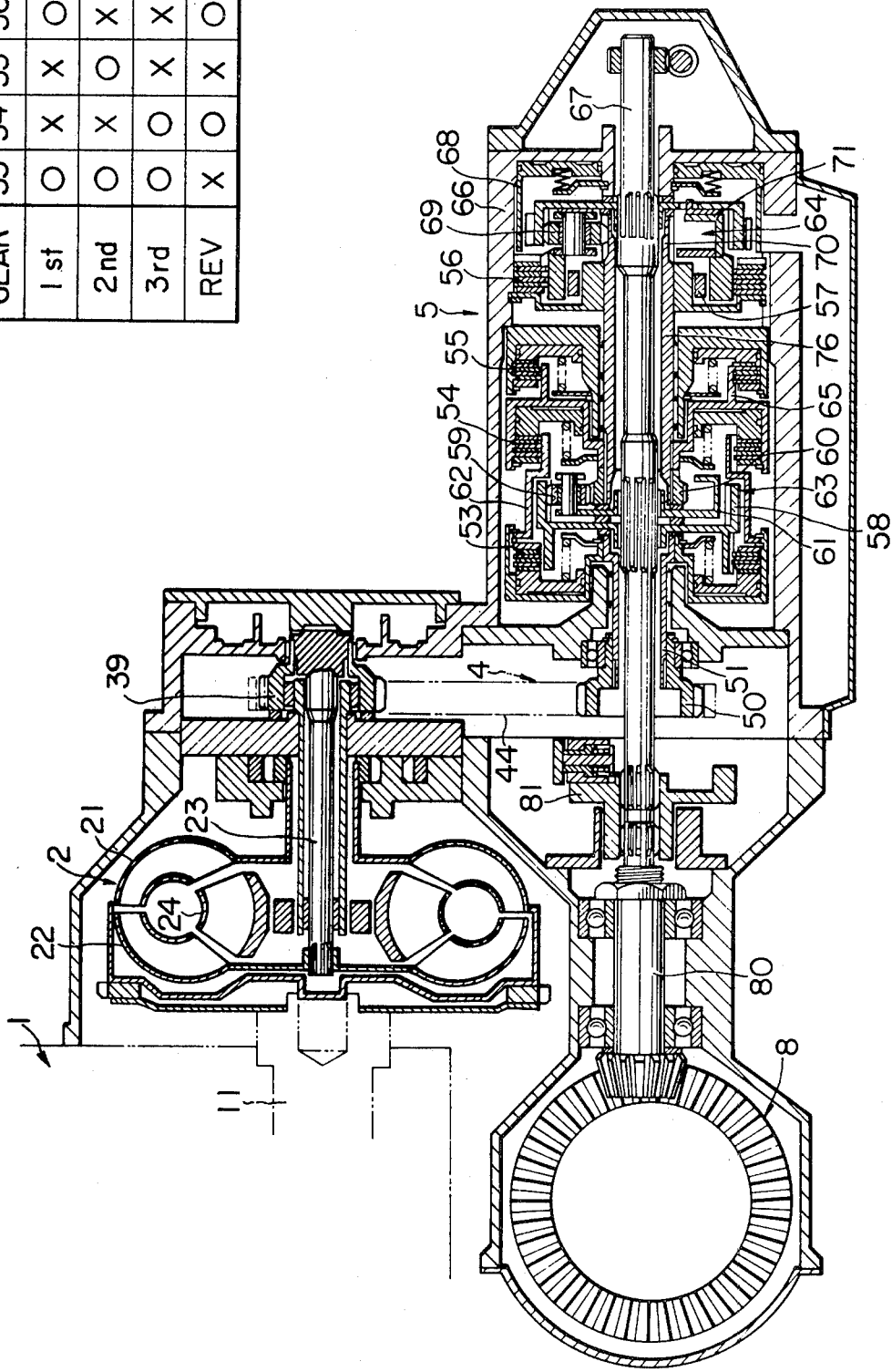
FIG. 4 is a cross-sectional view showing the detailed arrangement of the driving system with the overdrive means removed.
FIG. 5 is a table showing the operation of the transmission elements of the driving system of FIG. 4.

As is best shown in FIG. 4, the overdrive 3 may be added to or removed from the driving system with modifying the body proper of the transmission and with the replacement of a minimum number of parts. The overdrive apparatus 3, being compact in size in thus arranged to be an optional installation.

In this respect, the difference from the driving system of a motor vehicle with overdrive means 3 is that the output shaft 23 of the torque convertor 2 is coupled to the drive gear 39 of the transfer means 4, so that a rotational force is directly transmitted by way of the transfer means 4 to the automatic transmission 5, with the arrangement of other elements of the driving system remaining unchanged. A plug 85 and cover plate 87 may be added, for example, to enclose the torque convertor 2.

Since the overdrive means 3 is positioned in the rear space of the torque convertor, easy installation and removal of the overdrive means to and from the driving system is facilitated, the driving system thus being easily accommodated to the option of the user.

The removable arrangement of the overdrive means in the rear space of the torque convertor solved a cost problem, with which the overdrive means according to the prior art has been confronted, particularly in a driving system including FF or RR type automatic transmissions.

FIG. 5 shows a table illustrative of the operation of the transmission elements of the driving system without overdrive means, according to the present invention. In this figure, the designations "O" and "X" signify the same operational conditions as in FIG. 3. It will be noted that these operational conditions are not changed by the removal of the overdrive means.

It is apparent from the above description of the driving system according to the invention, that the automatic transmission is not positioned below the internal combustion engine and the torque convertor, resulting in increased design spaced in the vertical direction of the engine compartment. This results in a lower center of gravity position for the driving system, and enables an increase in the minimum height from the ground. In addition, according to the present invention, the output shaft of the automatic transmission may be provided either on the front or on the rear side of a vehicle, whereby the driving system may be applied not only to F-F and F-R sytems, but also to a four-wheel driving system.

Furthermore, the overdrive means is positioned to permit ready removal thereof. Inasmuch as the overdrive means is directly coupled to the output side of the torque convertor, the torque capacity of a torque convertor is increased, and the invention results in a driving system which is compact in size and light in weight.

It will be apparent to those skilled in the art that various modifications and variations could be made in the driving system of the invention without departing from the scope or spirit of the invention.

What is claimed is:

1. In a driving system acting in conjunction with a motor vehicle engine having an output shaft, the improvement comprising:
   a torque convertor coaxially coupled to the output shaft of the engine and having an output shaft,
   transfer means having a driving gear coaxially coupled to the output shaft of the torque convertor and a driven gear coupled to said driving gear,
   overdrive means having a planetary gear mechanism also coaxially coupled to the output shaft of said torque convertor and an output shaft coaxially but removably coupled to said driving gear of said transfer means,
   an automatic transmission coaxially coupled to said driven gear of said transfer means, having a planetary mechanism and friction engaging means to provide the desired mode of operation, and an output shaft on which said driven gear of said transfer means is coaxially mounted, and
   a differential gear having a driving gear coupled to the output shaft of said automatic transmission for driving the motor vehicle.

2. The driving system improvement of claim 1, wherein the output shaft of said automatic transmission is positioned at the front of said vehicle and said differential gear is positioned on the opposite side of said driven gear of said transfer means from said automatic transmission.

3. The driving system improvement of claim 2, wherein said automatic transmission is positioned below said overdrive means and said planetary gear mechanism of said overdrive means has an input shaft coaxially but removably coupled to the output shaft of said torque converter, whereby said overdrive means can be easily physically removed from said driving system and said system remains operable.

4. The driving system improvement of claim 3, wherein said torque convertor is substantially horizontally aligned with said overdrive means and said differential gear and automatic transmission are positioned below said torque converter and said engine.

5. The driving system improvement of claim 1, wherein the output shaft of said automatic transmission is positioned at the rear of said vehicle.

6. The driving system improvement of claim 5, wherein said automatic transmission is positioned below said overdrive means and said planetary gear mechanism of said overdrive means has an input shaft coaxially but removably coupled to the output shaft of said torque convertor, whereby said overdrive means can be easily physically removed from said driving system, and said system remains operable.

7. The driving system improvement of claim 6, wherein said torque convertor is substantially horizontally aligned with said overdrive means, said differential gear is substantially horizontally aligned with said automatic transmission and said differential gear and automatic transmission are positioned below said torque convertor and said engine.

8. The driving system improvement of claim 1, wherein said automatic transmission is positioned below said overdrive means and said overdrive means has an input shaft coaxially but removably coupled to the output shaft of said torque convertor, whereby said overdrive means can be easily physically removed from said driving system and said system remains operable.

9. The driving system improvement of claim 8, wherein said torque convertor is substantially horizontally aligned with said overdrive means, and said differential gear is substantially horizontally aligned with said automatic transmission and said differential gear and automatic transmission are positioned below said torque convertor and said overdrive means.

10. The driving system improvement of claim 1, wherein said torque convertor is substantially horizontally aligned with said overdrive means, and said differential gear is substantially horizontally aligned with said automatic and said differential gear and automatic transmission are positioned below said torque convertor and said overdrive means.

11. The driving system improvement of claim 1, further comprising an idler gear coupling said driven gear to the driving gear of the transfer means.

12. The driving system improvement of claim 11 wherein said automatic transmission is positioned below said overdrive means and said overdrive means has an input shaft coaxially but removably coupled to the output shaft of said torque convertor, whereby said overdrive means can be easily physically removed from said driving system and said system remains operable.

13. The driving system improvement of claim 12, wherein said torque convertor is substantially horizontally aligned with said overdrive means, and said differential gear is substantially horizontally aligned with said automatic transmission and said differential gear and automatic transmission are positioned below said torque convertor and said overdrive means.

14. The driving system improvement of claim 2, wherein said torque convertor is substantially horizontally aligned with said overdrive means, and said differential gear is substantially horizontally aligned with said automatic transmission and said differential gear and automatic transmission are positioned below said torque convertor and said overdrive means.

* * * * *

UNITED STATES PATENT AND TRADEMARK OFFICE
CERTIFICATE OF CORRECTION

PATENT NO. : 4,056,988
DATED : November 8, 1977
INVENTOR(S) : Seitoku Kubo; Kojiro Kuramochi; Kunio Morisawa and Kiyoshi Ohnuma It is certified that error appears in the above-identified patent and that said Letters Patent are hereby corrected as shown below:

Claim 3, line 6, "converter" should be --convertor--.

Claim 4, line 13, "converter" should be --convertor--.

Claim 10, line 51, after "automatic" (first occurrence) the word --transmission-- should be inserted.

Signed and Sealed this

Twenty-first Day of February 1978

[SEAL]

Attest:

RUTH C. MASON
Attesting Officer

LUTRELLE F. PARKER
Acting Commissioner of Patents and Trademarks